(12) United States Patent
Marking

(10) Patent No.: US 11,999,208 B2
(45) Date of Patent: Jun. 4, 2024

(54) ADJUSTABLE INTERNAL BYPASS

(71) Applicant: Fox Factory, Inc., Duluth, GA (US)

(72) Inventor: John Marking, El Cajon, CA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

(21) Appl. No.: 16/044,380

(22) Filed: Jul. 24, 2018

(65) Prior Publication Data

US 2018/0326805 A1 Nov. 15, 2018

Related U.S. Application Data

(63) Continuation of application No. 15/387,236, filed on Dec. 21, 2016, now Pat. No. 10,040,328, which is a
(Continued)

(51) Int. Cl.
| | |
|---|---|
| *B60G 13/06* | (2006.01) |
| *F16F 9/18* | (2006.01) |
| *F16F 9/46* | (2006.01) |
| *F16F 9/06* | (2006.01) |
| *F16F 9/516* | (2006.01) |

(52) U.S. Cl.
CPC ............. *B60G 13/06* (2013.01); *F16F 9/185* (2013.01); *F16F 9/46* (2013.01); *F16F 9/462* (2013.01); *F16F 9/468* (2013.01); *B60G 2202/24* (2013.01); *B60G 2206/41* (2013.01); *B60G 2500/11* (2013.01); *F16F 9/062* (2013.01); *F16F 9/065* (2013.01); *F16F 9/5165* (2013.01); *F16F 2228/066* (2013.01)

(58) Field of Classification Search
CPC .... F16F 9/185; F16F 9/46; F16F 9/462; F16F 9/468; B60G 13/06
See application file for complete search history.

(56) References Cited

U.S. PATENT DOCUMENTS

| | | |
|---|---|---|
| 1,078,060 A | 11/1913 | Newman |
| 1,307,502 A * | 6/1919 | Knudson .................. F16F 9/26 |
| | | 188/318 |

(Continued)

FOREIGN PATENT DOCUMENTS

| | | |
|---|---|---|
| DE | 3613386 A1 | 10/1986 |
| EP | 0403803 A1 | 12/1990 |

(Continued)

OTHER PUBLICATIONS

European Search Report for European Application No. 19212356.0, 8 pages, dated May 7, 2020 (May 7, 2020).

(Continued)

*Primary Examiner* — Vishal R Sahni

(57) ABSTRACT

A vehicle suspension damper includes: a cylinder and a piston assembly, wherein the piston assembly includes a piston; a working fluid within the cylinder; a bypass cylinder surrounding the cylinder and defining a cylindrical bypass channel; an adjustable bypass port fluidly coupling an interior of the cylinder and the cylindrical bypass channel; and a remotely operable bypass valve slidably disposed within the cylindrical bypass channel, the remotely operable bypass valve configured for, upon actuation of an actuator coupled with the remotely operable bypass valve, adjusting a flow of the working fluid through the adjustable bypass port.

6 Claims, 2 Drawing Sheets

Related U.S. Application Data continuation of application No. 14/487,529, filed on Sep. 16, 2014, now Pat. No. 9,528,565.

(56) References Cited

U.S. PATENT DOCUMENTS

| | | | | |
|---|---|---|---|---|
| 1,313,763 | A * | 8/1919 | Thomas | F16F 9/48 188/287 |
| 1,409,849 | A * | 3/1922 | Haeberlein | F16F 9/50 188/318 |
| 1,468,652 | A | 9/1923 | Storey et al. | |
| 1,560,477 | A * | 11/1925 | Kessler | F16F 9/44 188/318 |
| 1,571,788 | A * | 2/1926 | Bramlette, Jr. | F16F 9/44 188/318 |
| 2,354,340 | A * | 7/1944 | Utter | D03D 49/38 139/161 F |
| 3,107,753 | A * | 10/1963 | Georgette | F16F 9/43 188/313 |
| 3,207,270 | A * | 9/1965 | Ellis, Jr. | F16F 9/43 188/287 |
| 5,295,563 | A | 3/1994 | Bennett | |
| 5,558,190 | A * | 9/1996 | Chang | A63B 21/0087 188/285 |
| 6,112,868 | A * | 9/2000 | Graham | B60G 17/002 188/318 |
| 6,360,857 | B1 * | 3/2002 | Fox | F16F 9/3485 188/281 |
| 6,648,109 | B2 * | 11/2003 | Farr | F16F 9/062 188/285 |
| 6,883,650 | B2 * | 4/2005 | van Wonderen | F16F 9/346 188/285 |
| 7,270,222 | B1 * | 9/2007 | Aymar | F16F 9/461 188/285 |
| 7,320,387 | B2 | 1/2008 | Sendrea | |
| 7,325,660 | B2 * | 2/2008 | Norgaard | F16F 9/3235 188/285 |
| 7,374,028 | B2 | 5/2008 | Fox | |
| 9,038,791 | B2 | 5/2015 | Marking | |
| 9,528,565 | B2 | 12/2016 | Marking | |
| 9,765,842 | B2 | 9/2017 | Noguchi | |
| 10,012,282 | B2 | 7/2018 | Kimura et al. | |
| 10,040,328 | B2 | 8/2018 | Marking | |
| 2001/0042663 | A1 * | 11/2001 | Marking | F16F 9/0209 188/266 |
| 2010/0326780 | A1 * | 12/2010 | Murakami | F16F 9/187 188/322.13 |
| 2011/0214956 | A1 * | 9/2011 | Marking | B60G 13/06 188/313 |
| 2015/0233442 | A1 | 8/2015 | Noguchi | |
| 2015/0276000 | A1 | 10/2015 | Kimura et al. | |
| 2016/0076617 | A1 | 3/2016 | Marking | |
| 2016/0200163 | A1 | 7/2016 | Tsukahara | |
| 2017/0268595 | A1 | 9/2017 | Inagaki et al. | |
| 2018/0156300 | A1 | 6/2018 | Sakai | |
| 2018/0208011 | A1 | 7/2018 | Wigg et al. | |
| 2019/0176557 | A1 | 6/2019 | Marking et al. | |

FOREIGN PATENT DOCUMENTS

| | | |
|---|---|---|
| EP | 2410203 A2 | 1/2012 |
| KR | 20100041679 A | 4/2010 |
| RU | 2469224 C1 | 12/2012 |

OTHER PUBLICATIONS

Machine translation DE3613386; Oct. 1986.
Machine translation EP 0403803; Dec. 1990.
Machine translation KR20100041679; Apr. 2010.

* cited by examiner

ADJUSTABLE INTERNAL BYPASS

CROSS-REFERENCE TO RELATED APPLICATIONS

This application is a continuation application of and claims priority to and benefit of co-pending U.S. patent application Ser. No. 15/387,236, filed on Dec. 21, 2016 entitled, "ADJUSTABLE INTERNAL BYPASS" by John Marking, assigned to the assignee of the present application, and incorporated herein, in its entirety, by reference.

The application Ser. No. 15/387,236 is a continuation application of and claims priority to and benefit of U.S. patent application Ser. No. 14/487,529, filed on Sep. 16, 2014, now U.S. Issued U.S. Pat. No. 9,528,565, entitled, "ADJUSTABLE INTERNAL BYPASS" by John Marking, assigned to the assignee of the present application, and incorporated herein, in its entirety, by reference.

FIELD OF THE INVENTION

Embodiments of the present technology generally relate to a damper assembly for a vehicle. More specifically, certain embodiments relate to a remotely operated bypass valve used in conjunction with a vehicle damper.

BACKGROUND

Vehicle suspension systems typically include a spring component or components and a damping component or components. Typically, mechanical springs, like helical springs are used with some type of viscous fluid-based damping mechanism and the two are mounted functionally in parallel. In some instances, features of the damper or spring are user-adjustable. What is needed is an improved method and apparatus for adjusting damping characteristics, including remote adjustment.

SUMMARY OF EMBODIMENTS

Embodiments include a vehicle suspension damper that comprises: a cylinder and a piston assembly, wherein the piston assembly includes a piston; a working fluid within the cylinder; a bypass cylinder surrounding the cylinder and defining a cylindrical bypass channel; an adjustable bypass port fluidly coupling an interior of the cylinder and the cylindrical bypass channel; and a remotely operable bypass valve slidably disposed within the cylindrical bypass channel, the remotely operable bypass valve configured for, upon actuation of an actuator coupled with the remotely operable bypass valve, adjusting a flow of the working fluid through the adjustable bypass port.

Embodiments also include: remotely operable bypass valve for operation within a vehicle suspension damper, the remotely operable bypass valve comprising: a threaded plug coupled with an actuator, wherein the threaded plug is configured for being angularly displaced within a cylindrical bypass channel about a longitudinal axis of the threaded plug relative to a piston in response to an operation of the actuator, wherein the cylindrical bypass channel is defined by a bypass cylinder surrounding a cylinder of the vehicle suspension damper; a rod disposed adjacent to the threaded plug, wherein the rod is configured for moving along the longitudinal axis within the cylindrical bypass channel in response to an angular displacement experienced by the threaded plug; and a sleeve disposed adjacent to the rod, wherein the sleeve is configured for moving along the longitudinal axis within the cylindrical bypass channel in response to the moving by the rod, wherein the sleeve provides an adjustment to a flow of a working fluid through an adjustable bypass port fluidly coupling an interior of the cylinder and the cylindrical bypass channel.

BRIEF DESCRIPTION OF THE DRAWINGS

So that the manner in which the above recited features can be understood in detail, a more particular description may be had by reference to embodiments, some of which are illustrated in the appended drawings. It is to be noted, however, that the appended drawings illustrate only typical embodiments of this invention and are therefore into to be considered limiting of its scope, for the invention may admit to other equally effective embodiments.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

Overview of Discussion

Embodiments disclosed herein provide a damping mechanism for a vehicle suspension damper in which a bypass cylinder surrounds a cylinder of the vehicle suspension damper, thereby defining a cylindrical bypass channel. An adjustable bypass port fluidly couples the interior of the cylinder with the cylindrical bypass channel. A remotely operable bypass valve functions within the cylindrical bypass channel to meter the flow of damping fluid from the interior of the cylinder, through the adjustable bypass port leading to the cylindrical bypass channel, and ultimately to a rebound portion of the cylinder. The remotely operable bypass valve may be operated remotely and manually by a user via an actuator extending outside of the vehicle suspension damper and operable. In some embodiments, the remotely operable bypass valve operates in conjunction with other damping mechanisms integrated within the vehicle suspension damper.

The following discussion will begin with a general description of a vehicle suspension damper, including the remotely operable bypass valve, in accordance with an embodiment. (See FIG. 1) The discussion continues with a detailed description of the remotely operable bypass valve, in accordance with an embodiment. (See FIG. 2)

As used herein, the terms "down", "up", "down-ward", "upward", "lower", "upper" and other direction references are relative and are used for reference only.

Example Vehicle Suspension Damper with Remotely Operable Bypass Valve

Figure 1:
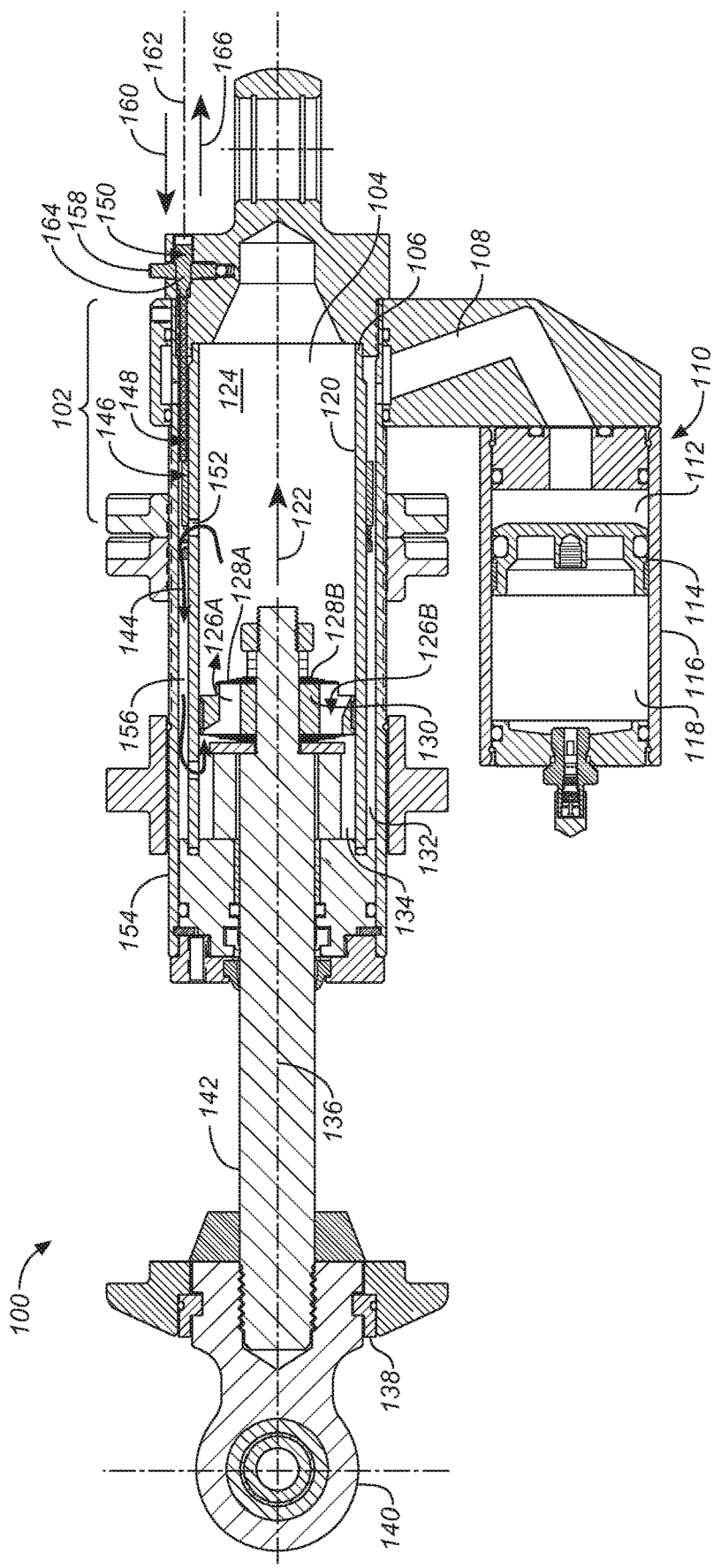
FIG. 1 is a section view showing a vehicle suspension damper with a bypass, in accordance with an embodiment.

FIG. 1 illustrates a vehicle suspension damper 100 with a remotely operable bypass valve 102, in accordance with an embodiment. The vehicle suspension damper 100 includes a cylinder 120 having an interior 124, a first end 132, a second end 106 and defining an axis 136. The vehicle suspension damper 100 further includes a piston rod 142 and a piston 130. The piston 130 is movably mounted within the cylinder 120 for moving between the first end 132 and the second end 106. A bypass cylinder 154 surrounds the cylinder 120 and defines a cylindrical bypass channel 156. The adjustable bypass port 152, when open, fluidly couples the interior 124 of the cylinder 120 and the cylindrical bypass channel 156, permitting some damping fluid to bypass the vented piston 130 when the piston 130 is positioned on the rebound portion 134 side of the adjustable bypass port 152.

In one embodiment, the fluid meters from one side of the piston 130 to the other side by passing through flow paths 126A and 126B formed in the piston 130. In the embodiment shown, shims 128A and 128B are used to partially obstruct the flow paths 126A and 126B in each direction. By selecting shims 128A and 128B having certain desired stiffness characteristics, the damping effects caused by the piston 130 can be increased or decreased and damping rates can be different between the compression and rebound strokes of the piston 130. For example, shims 128A are configured to meter rebound flow from the rebound portion 134 of the cylinder 120 to the compression portion 104 of the cylinder 120. Shims 128B, on the other hand, are configured to meter compression flow from the compression portion 104 of the cylinder 120 to the rebound portion 134. In one embodiment, shims 128B are not included on the rebound portion side, nor is there a compression flow path such as path 126B, leaving the piston 130 essentially "locked out" in the compression stroke without some means of flow bypass. Note that piston apertures (not shown) may be included in planes other than those shown (e.g. other than apertures used by paths 126A and 126B) and further that such apertures may, or may not, be subject to the shims 128A and 128B as shown (because for example, the shims 128A and 128B may be clover-shaped or have some other non-circular shape). In one embodiment, the piston 130 is solid and all damping flow must traverse a flow bypass and/or communicate with a reservoir.

A reservoir 110 is in fluid communication with the cylinder 120 for receiving and supplying damping fluid as the piston rod 142 moves in and out of the cylinder 120. The reservoir 110 includes a reservoir cylinder 116 in fluid communication with the rebound portion 134 of the damper cylinder 120 via the fluid conduit 108. The reservoir 110 also includes a floating piston 114 with a volume of gas on a backside 118 ("blind end" side) of it, the gas being compressible as the reservoir cylinder 116, on the "frontside" 112 fills with damping fluid due to movement of the piston rod 142 and the piston 130 into the damper cylinder 120. Certain features of reservoir type dampers are shown and described in U.S. Pat. No. 7,374,028, which is incorporated herein, in its entirety, by reference. The upper portion of the piston rod 142 is supplied with a bushing set 138 for connecting to a portion of a vehicle wheel suspension linkage. In another embodiment, not shown, the upper portion of the piston rod 142 (opposite the piston 130) may be supplied with an eyelet 140 to be mounted to one part of the vehicle, while the lower part of the vehicle suspension damper 100 is attached to another portion of the vehicle, such as the frame, and moves independently of the first part. A spring member (not shown) is usually mounted to act between the same portions of the vehicle as the vehicle suspension damper. As the piston rod 142 and the piston 130 move into the cylinder 102 (during compression), the damping fluid slows the movement of the two portions of the vehicle relative to each other due, at least in part, to the incompressible fluid moving through the shimmed paths 126B (past shims 128B) provided in the piston 130 and/or through an adjustable bypass port 152, as will be described herein. As the piston rod 142 and the piston 130 move out of the cylinder 120 (during extension or "rebound"), fluid meters again through shimmed paths 126A and the flow rate and corresponding rebound rate is controlled, at least in part, by the shims 128A. In FIG. 1, the piston 130 is shown at full extension and moving downward in a compression stroke, the movement shown by arrow 122.

Example Remotely Operable Bypass Valve

Figure 2:
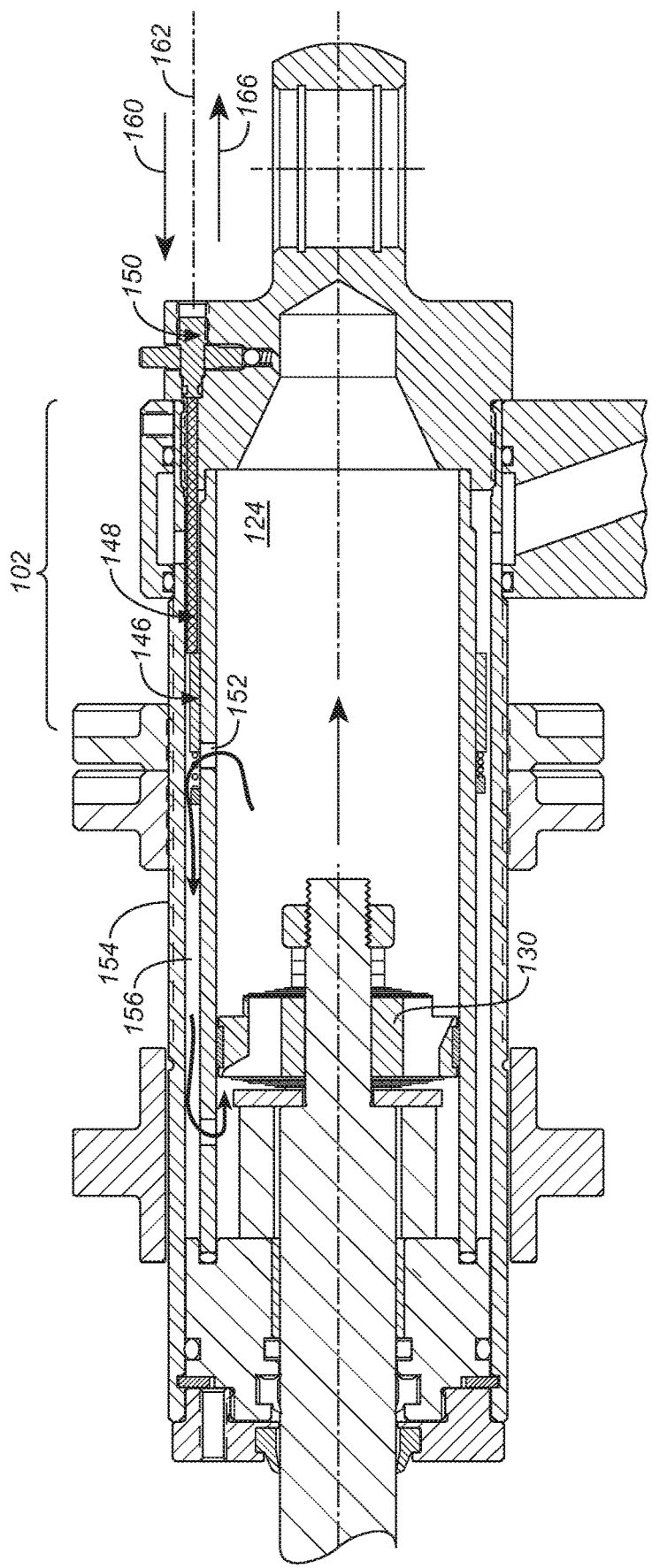
FIG. 2 is an enlarged section view showing a valve of the bypass in an open position, in accordance with an embodiment.

FIG. 2 is an enlarged view showing the remotely operable bypass valve 102, in accordance with an embodiment. As noted, the adjustable bypass port 152, when open, fluidly couples the interior 124 of the cylinder 120 with the cylindrical bypass channel 156, according to an embodiment. The adjustable bypass port 152 permits the damping fluid to travel from a first side of the piston 130 to the other side without traversing shimmed flow paths 126A and 125B that may otherwise be traversed in a compression stroke of the vehicle suspension damper 100. In FIGS. 1 and 2, the adjustable bypass port 152 is shown in an "open" position with the flow of fluid through the bypass shown by arrows 144 from a compression side to a rebound side of the piston 130.

In one embodiment, the entry pathway to the adjustable bypass port 152 in the embodiment shown in FIGS. 1 and 2 is located between the middle and the second end 106 of the cylinder 120. In one embodiment, as selected by design (e.g., axial location of the entry pathway to the adjustable bypass port 152), the adjustable bypass port 152 will not operate after the piston 130 passes the entry to the adjustable bypass port 152 near the end of a compression stroke (or elsewhere in the stroke as desired). In one embodiment, this "position sensitive" feature ensures increased damping will be in effect near the end of the compression stroke to help prevent the piston 130 from approaching a "bottomed out" position (e.g. impact) in the cylinder 120. The adjustable bypass port 152 and the remotely operable bypass valve 102 of the present embodiments can be used in any combination with the bypass valves shown and described in co-pending U.S. patent application Ser. Nos. 13/010,697.

The remotely operable bypass valve 102, in accordance with embodiments, includes a threaded plug 150, a rod 148 and a sleeve 146 disposed within the cylindrical bypass channel 156. In brief, an actuator 158 causes the threaded plug 150 to push the rod 148. The rod 148 then pushes the sleeve 146. The sleeve 146 then moves to at least partially cover the adjustable bypass port 152. More particularly, the actuator 158 is operatively connected to the threaded plug 150 such that the threaded plug 150 can be angularly displaced in the direction of arrow 160 about its longitudinal axis 162 relative to the piston 130 in response to operation of the actuator 158. The actuator 158 is in the form of a dial, or thumb wheel, secured on the threaded plug 150 at 164. The actuator 158 extends radially outwardly from the threaded plug 150 such that the threaded plug 150 can be angularly displaced about its longitudinal axis 162 relative to the piston 130 in response to angular displacement of the actuator 158 relative to the piston 130. Of note, depending on the movement of the actuator 158, the sleeve 146 may occupy a position within the cylindrical bypass channel 156 such that the sleeve 146 completely blocks the opening of the adjustable bypass port 152, partially blocks the opening of the adjustable bypass port 152, or does not block the opening of the adjustable bypass port 152 at all.

As can be seen in FIGS. 1 and 2, the actuator 158 extends to a position outside of the rest of the vehicle suspension damper 100 so as to enable a user to turn the actuator 158 from outside the rest of the vehicle suspension damper 100. A turning of the actuator 158 by the user may be referred to as an operation of the actuator 158 by the user. In one embodiment, a detent (not shown) is provided on the actuator 158. The detent is provided for releasably locking the actuator 158 at a selected angular position relative to the piston 130. The detent typically includes a ball which cooperates with a helical spring to urge the ball into complementary recesses on the actuator 158. Certain detent features are described and shown in U.S. Pat. No. 6,360,857, which is incorporated herein, in its entirety, by reference.

It should be appreciated that when the actuator 158 is rotated in a reverse direction than that described above and herein, the threaded plug 150 moves in the direction of the arrow 166. As the threaded plug 150 moves in the direction of the arrow 166, the rod 148, and hence also the sleeve 146, moves in the direction of the arrow 166, and the adjustable bypass port 152 is at least partially opened. In one embodiment, upon the movement of the threaded plug 150 in the direction of the arrow 166, the rod 148 and the sleeve 146 moves in the direction of the arrow 166 due to gravity and/or the force applied by the damping fluid against the sleeve 146 from the interior 124 of the cylinder 120 and toward the cylindrical bypass channel 156.

Thus, in addition to the damping features provided by the shims 128A and 128B through the flow paths 126A and 126B, embodiments enable the metering of damping fluid from the interior 124 of the cylinder 120 to the rebound portion 134 of the vehicle suspension damper 100, via the remotely operable bypass valve 102 applied to the adjustable bypass port 152.

It should be noted that any of the features disclosed herein may be useful alone or in any suitable combination. While the foregoing is directed to embodiments of the present invention, other and further embodiments of the invention may be implemented without departing from the scope of the invention, and the scope thereof is determined by the claims that follow.

I claim:

1. A vehicle suspension damper comprising:
   a cylinder and a piston assembly, wherein said piston assembly comprises a piston having a first side and a second side, said piston including a compression flow path formed through said piston, said piston including a rebound flow path formed through said piston;
   a working fluid within said cylinder;
   a bypass cylinder surrounding said cylinder and defining a cylindrical bypass channel having a central axis which is approximately colinear with a central axis of said cylinder, said cylindrical bypass channel providing a path for said working fluid to travel from said first side of said piston to said second side of said piston without traversing said compression flow path formed through said piston during a compression stroke of said piston and without traversing said rebound flow path formed through said piston during a rebound stroke of said piston;
   an adjustable bypass port fluidly coupling an interior of said cylinder and said cylindrical bypass channel; and
   a bypass valve slidably disposed within said cylindrical bypass channel, said bypass valve configured for, upon actuation of an actuator coupled with said bypass valve, adjusting a flow of said working fluid through said adjustable bypass port;
   said bypass valve further comprises:
      a threaded plug coupled with said actuator, wherein said threaded plug is configured for being angularly displaced within said cylindrical bypass channel about a longitudinal axis of said threaded plug in response to an operation of said actuator;
      a rod disposed adjacent to said threaded plug, wherein said rod is configured for moving perpendicular to said longitudinal axis of said threaded plug and for moving along said longitudinal axis within said cylindrical bypass channel in response to an angular displacement experienced by said threaded plug; and
      a sleeve coupled to said rod and extending from said rod along the same longitudinal axis as said rod, wherein said sleeve is configured for moving along said longitudinal axis within said cylindrical bypass channel in response to said moving by said rod, wherein said sleeve provides an adjustment to said flow of said working fluid through said adjustable bypass port.

2. The vehicle suspension damper of claim 1, wherein said actuator comprises:
   a thumb wheel secured onto said threaded plug.

3. The vehicle suspension damper of claim 1, wherein said adjusting said flow of said working fluid through said adjustable bypass port comprises:
   a closure of said adjustable bypass port, thereby stopping said flow of said working fluid.

4. The vehicle suspension damper of claim 1, wherein said adjusting said flow of said working fluid through said adjustable bypass port comprises:
   fully opening of said adjustable bypass port, thereby allowing said flow of said working fluid.

5. The vehicle suspension damper of claim 1, wherein said adjusting said flow of said working fluid through said adjustable bypass port comprises:
   partially opening of said adjustable bypass port, thereby enabling a partial flow of said working fluid.

6. The vehicle suspension damper of claim 1 wherein said actuator further comprises:
   a remotely operable actuator which extends to a position outside of said vehicle suspension damper, such that said remotely operable actuator is enabled to be turned from said outside of said vehicle suspension damper.

* * * * *